US007293582B2

(12) United States Patent
Klopp et al.

(10) Patent No.: US 7,293,582 B2
(45) Date of Patent: Nov. 13, 2007

(54) METHOD AND APPARATUS FOR PRECLUDING BACKFLOW IN A MIXING VALVE SUBJECTED TO UNBALANCED INLET PRESSURE

(75) Inventors: Jerome C. Klopp, Arlington Heights, IL (US); Philip C. Hawken, Darien, IL (US)

(73) Assignee: Robertshaw Controls Company, Richmond, VA (US)

( * ) Notice: Subject to any disclaimer, the term of this patent is extended or adjusted under 35 U.S.C. 154(b) by 288 days.

(21) Appl. No.: 11/095,922

(22) Filed: Mar. 31, 2005

(65) Prior Publication Data

US 2006/0219310 A1 Oct. 5, 2006

(51) Int. Cl.
*F16K 11/24* (2006.01)

(52) U.S. Cl. ...................................... 137/607; 137/897

(58) Field of Classification Search .................... 137/3, 137/606, 607, 897

See application file for complete search history.

(56) References Cited

U.S. PATENT DOCUMENTS 2,325,333 A * 7/1943 McKendrick ............... 137/594
2,585,184 A * 2/1952 Storrie ....................... 137/597
3,094,139 A * 6/1963 Budde et al. ............ 137/454.6
3,610,279 A 10/1971 McIntosh et al.
3,684,168 A 8/1972 McIntosh et al.
3,968,816 A * 7/1976 Tagansky .................... 137/606
5,058,624 A * 10/1991 Kolze ......................... 137/607
5,111,846 A * 5/1992 Hochstrasser et al. ...... 137/607
5,172,713 A * 12/1992 Hall ........................ 137/15.21
5,425,255 A 6/1995 Pick
5,720,316 A * 2/1998 Simotti .................... 137/454.2
2003/0233711 A1 12/2003 Marsh et al.

* cited by examiner

*Primary Examiner*—Stephen M. Hepperle
(74) *Attorney, Agent, or Firm*—Reinhart Boerner Van Deuren, P.C.

(57) ABSTRACT

An apparatus and method are provided for precluding back-flow of fluid in a mixing valve, through use of a manifold of the mixing valve including a septum wall in an intermediate divided segment of an outlet conduit of the manifold.

17 Claims, 7 Drawing Sheets

METHOD AND APPARATUS FOR PRECLUDING BACKFLOW IN A MIXING VALVE SUBJECTED TO UNBALANCED INLET PRESSURE

FIELD OF THE INVENTION

This invention relates to mixing valves having first and second diaphragm operated control valves for respectively regulating fluid flows from a first and a second source of fluid, and more particularly to precluding backflow through the mixing valve, from the second source into the first source, when the fluid pressure of the first fluid source is lower than the fluid pressure of the first fluid source.

BACKGROUND OF THE INVENTION

Water fill systems for automatic washing machines typically include a water mixing valve having dual inlets for connection to a source of heated water and a source of cold water, to provide a mixed flow of water at a desired temperature for use in the washing machine.

As shown in FIG. 1A, in one commonly utilized form of such a mixing valve 10, a first and a second solenoid actuated diaphragm valve 12, 14 are operatively connected to a mixing valve manifold 16, which is adapted for connection to a source of hot water, a source of cold water, and to provide a mixed stream of flow from the hot and cold sources at an outlet 22 of the mixing valve 10. As show in FIGS. 1A and 1B, the manifold 16 of such mixing valves 10 typically includes a body 24 which defines the first fluid inlet 18, the second fluid inlet 20, the fluid outlet 22, a first diaphragm chamber 26 for the first control valve 12, a second diaphragm chamber for the second control valve 14, and an L-shaped outlet conduit 30 which is connected directly in fluid communication between the outlet 22 and the first and second diaphragm chambers 26, 28. By virtue of this arrangement, mixing of the fluid streams entering the mixing valve through the first and second inlets 18, 20 can occur along the entire length of the outlet conduit 30.

Manifolds 16 of the type described above, having an outlet conduit 30 providing direct fluid communication between the first and second diaphragm chambers 26, 28 and the outlet 22, have been utilized for many years, and provide very satisfactory performance where the pressure of the fluid sources attached to the first and second inlets 18, 20 are substantially equal. Generally in circumstances where both the first and second inlet 18, 20 receive fluid from the same ultimate source, such as a city water main, or a pressure tank of a well system, the pressure at the first and second inlets 18, 20 will remain substantially equal, even though the fluid stream to the first inlet 18, for example, may flow through a water heater prior to reaching the mixing valve 10.

FIG. 1C, and arrows 21 in FIG. 1D illustrate the manner in which water will flow through a prior mixing valve 10, of the type described above, when the pressure is substantially equal at the first and second inlets 18, 20.

Where the second inlet 20 is connected to receive fluid flow from a pressurized source, such as a cold water line, and the first inlet 18 is connected to receive fluid from an unpressurized, or very low pressure source, such as a solar heater or hot water tank mounted on the roof of a building, however, it is desirable to provide means within the manifold 16 to preclude having the higher fluid pressure in the second inlet overpower the diaphragm in the first valve assembly and thereby allow a backflow of fluid from the second inlet into the first pressure source through the first inlet 18, as shown by arrow 23 in FIG. 1D.

BRIEF SUMMARY OF THE INVENTION

The invention provides an apparatus and method for precluding backflow of fluid in a mixing valve, through the use of a manifold of the mixing valve including a septum wall in an intermediate divided segment of an outlet conduit of the manifold. The septum wall keeps the flow streams from a high pressure inlet separated from the flow stream from a low pressure inlet over a substantial length of the outlet conduit, to thereby provide improved resistance to backflow. In one form of the invention, a manifold for a mixing valve includes a body defining a first fluid inlet, a second fluid inlet, a fluid outlet, a first diaphragm chamber for a first control valve, a second diaphragm chamber for a second control valve, and an outlet conduit. The first diaphragm chamber includes an inlet and a valve seat defining an outlet of the first diaphragm chamber. The outlet of the first diaphragm chamber is disposed within the valve seat of the first diaphragm chamber. The inlet of the first diaphragm chamber is disposed outside of the seat, within the first diaphragm chamber, and connected in fluid communication with the first inlet.

The second diaphragm chamber includes an inlet and a valve seat defining an outlet of the second diaphragm chamber. The outlet of the second diaphragm chamber is disposed within the valve seat of the second diaphragm chamber. The inlet of the second diaphragm chamber is disposed outside of the valve seat, within the second diaphragm chamber, and connected in fluid communication with the second inlet.

The outlet conduit has an outlet thereof connected to the fluid outlet, a mixing chamber adjacent the outlet, and a divided intermediate segment disposed between the mixing chamber and the outlets of the first and second diaphragm chambers. The divided intermediate segment of the outlet conduit has an imperforate septum wall therein, dividing the intermediate section of the outlet conduit into a first and a second fluid passage. The first fluid passage is connected in fluid communication between the mixing chamber and only the outlet of the first diaphragm chamber. The second fluid passage of the intermediate section of the outlet conduit is connected in fluid communication between the mixing chamber and only the outlet of the second diaphragm chamber.

The outlet conduit may further include an undivided segment thereof disposed between the second fluid passage of the divided intermediate segment of the outlet conduit and the outlet of the second diaphragm chamber. The septum wall of the divided intermediate segment of the outlet conduit may form a portion of a wall extending from the valve seat of the first diaphragm chamber.

The diaphragm chamber may include a wall thereof separating the first diaphragm chamber from the second fluid passage of the divided intermediate segment of the outlet conduit. The first diaphragm chamber may define an outer periphery thereof, with the divided intermediate segment of the outlet conduit extending beyond the outer periphery of the first diaphragm chamber. In some embodiments of the invention, the first and second fluid passages of the divided intermediate segment of the outlet conduit may have substantially equal cross-sectional areas. In other embodiments of the invention, the first and second fluid passages of the divided intermediate section of the outlet conduit may have unequal cross-sectional areas. The mixing chamber of the outlet conduit may be sized to have a cross-sectional area larger than the combined cross-sectional areas of the first and second flow passages of the divided intermediate segment of the outlet conduit.

The invention may also take the form of a mixing valve having a first and a second diaphragm control valve operatively attached to a manifold according to the invention. The invention may also take the form of a method for precluding backflow in a mixing valve having a first and second diaphragm valve adapted for connection respectively to a first and second source of fluid pressure, with the fluid pressure of the first source being lower than the fluid pressure of the second source, through connection of the sources to one another with a manifold of a mixing valve in accordance with the invention.

Other aspects, objectives and advantages of the invention will become more apparent from the following detailed description when taken in conjunction with the accompanying drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1A:
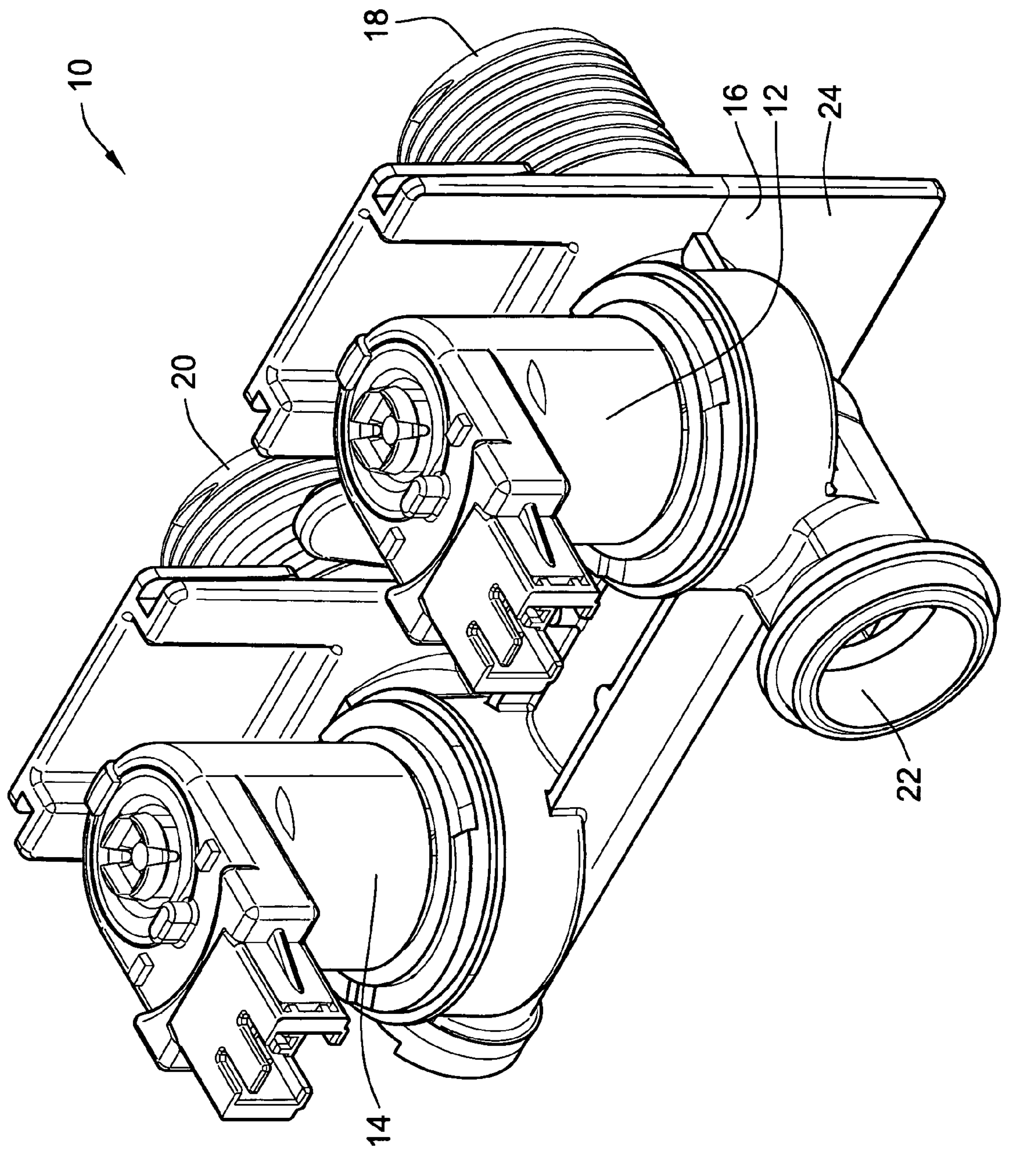
FIG. 1A (PRIOR ART)
FIG. 1A is a perspective view of a prior mixing valve.
Figure 1B:
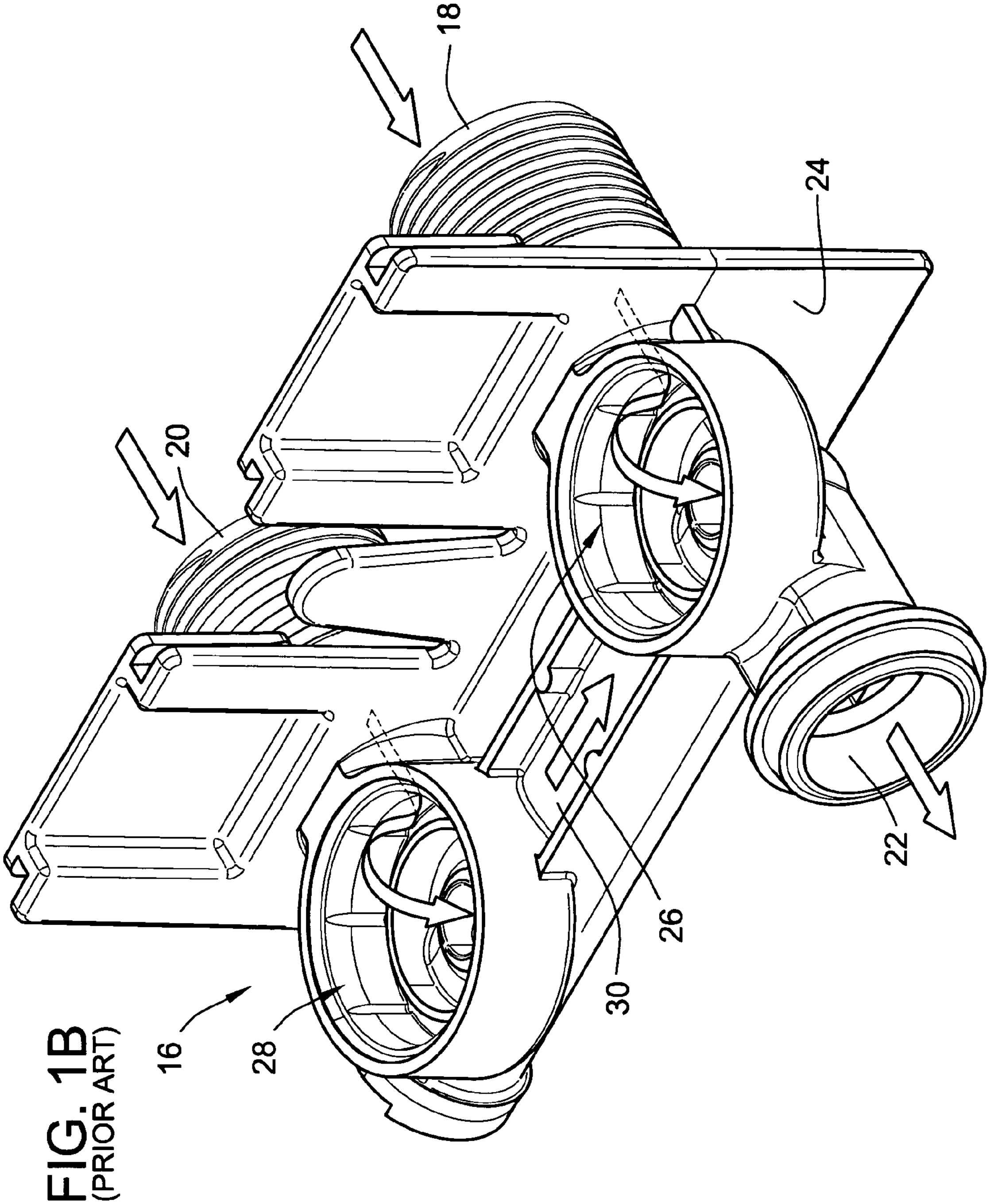
FIG. 1B (PRIOR ART)
FIG. 1B is a perspective view of a manifold of the mixing valve of FIG. 1A.
Figure 2D:
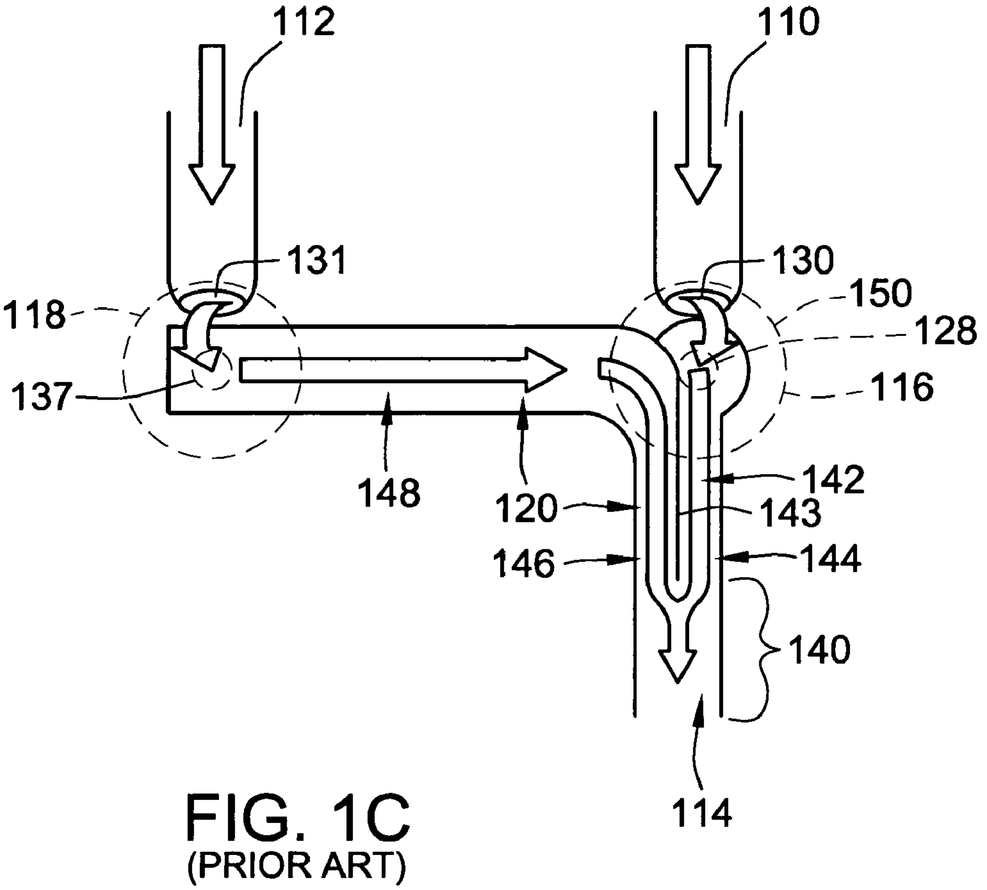
FIG. 2D is a schematic illustration of fluid flow through the manifold of FIG. 2B.
Figure 2E:
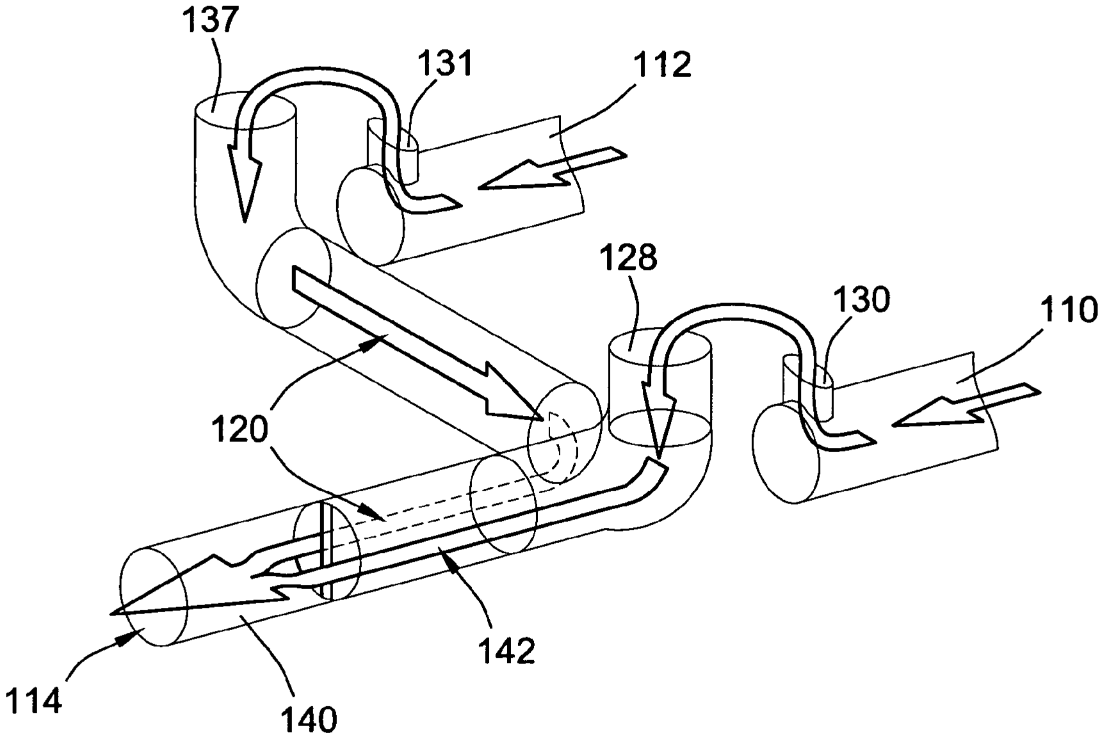
FIG. 2E is a perspective illustration of flow passages within the manifold of FIG. 2B.
Figure 2A:
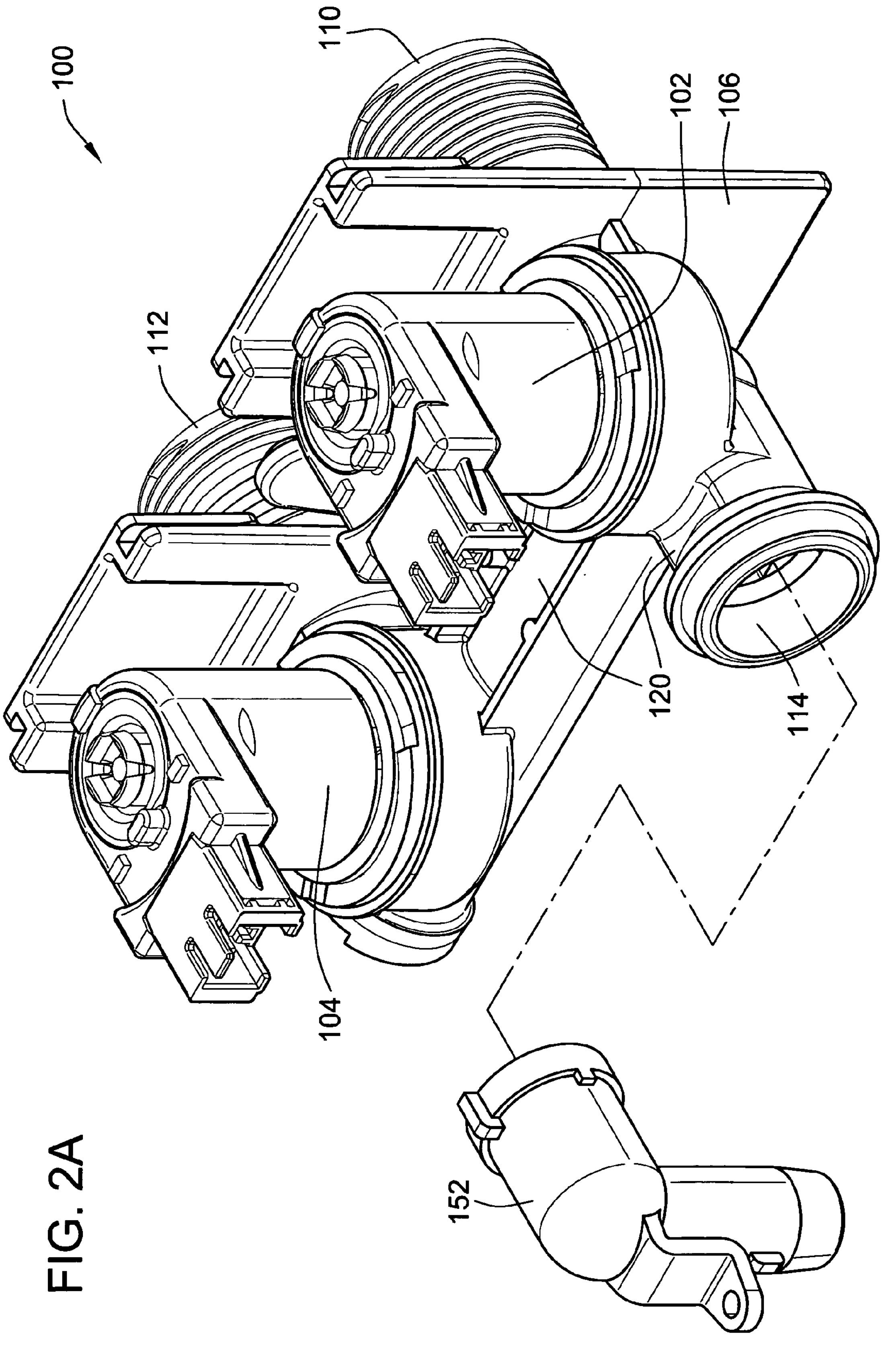
FIG. 2A is a perspective illustration of an exemplary embodiment of a mixing valve, according to the invention.
Figure 2B:
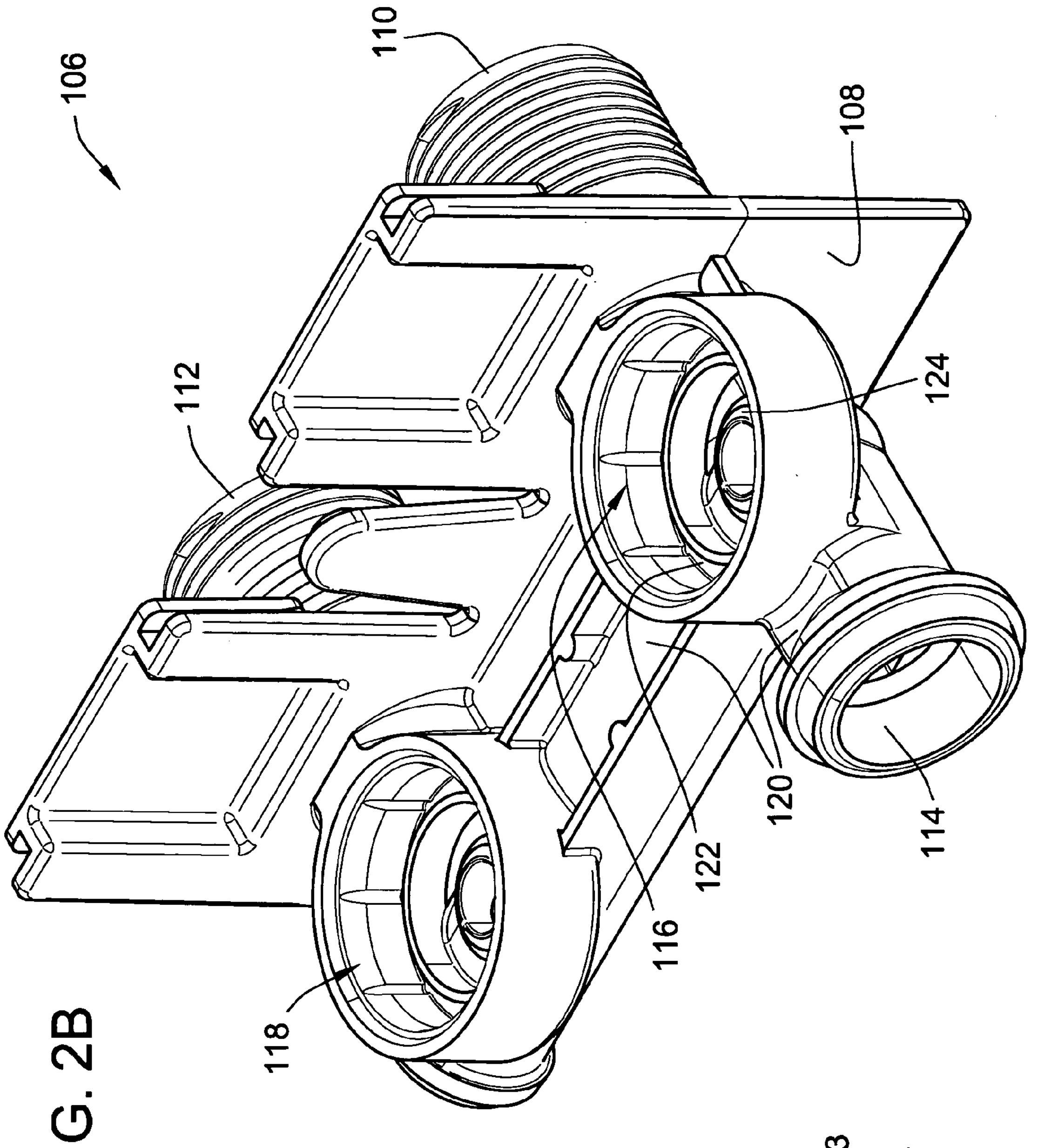
FIG. 2B is a perspective illustration of a manifold of the mixing valve of FIG. 2A.

FIG. 2A shows an exemplary embodiment of a mixing valve 100, according to the invention, having a first and a second diaphragm control valve 102, 104, operatively attached to a manifold 106. FIG. 2B shows the manifold 106 of the mixing valve 100 with the first and second diaphragm control valves 102, 104 removed to facilitate understanding of the details of construction of the manifold 106.

As shown in FIG. 2B, the manifold 106 includes a body 108 defining a first fluid inlet 110, a second fluid inlet 112, a fluid outlet 114. The body 108 of the manifold 106 also defines a first diaphragm chamber 116, for operative attachment thereto of the first control valve 102, and a second diaphragm chamber 118 for operative attachment thereto of the second control valve 104. The body 108 of the manifold 106 further defines an L-shaped outlet conduit 120, which will be described in greater detail below.

Figure 2F:
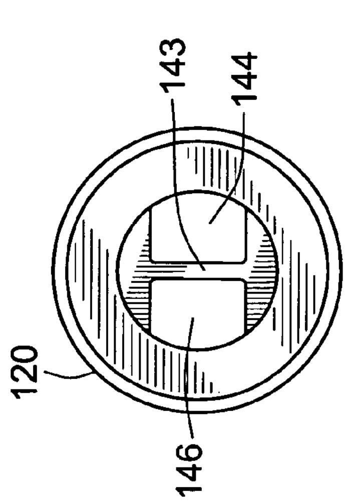
FIG. 2F is a view looking into the outlet of the exemplary embodiment of the manifold 2B, illustrating the cross-sectional area of a first and a second flow passage within a divided intermediate segment of an outlet conduit of the manifold by a septum wall of the divided segment.
Figure 2C:
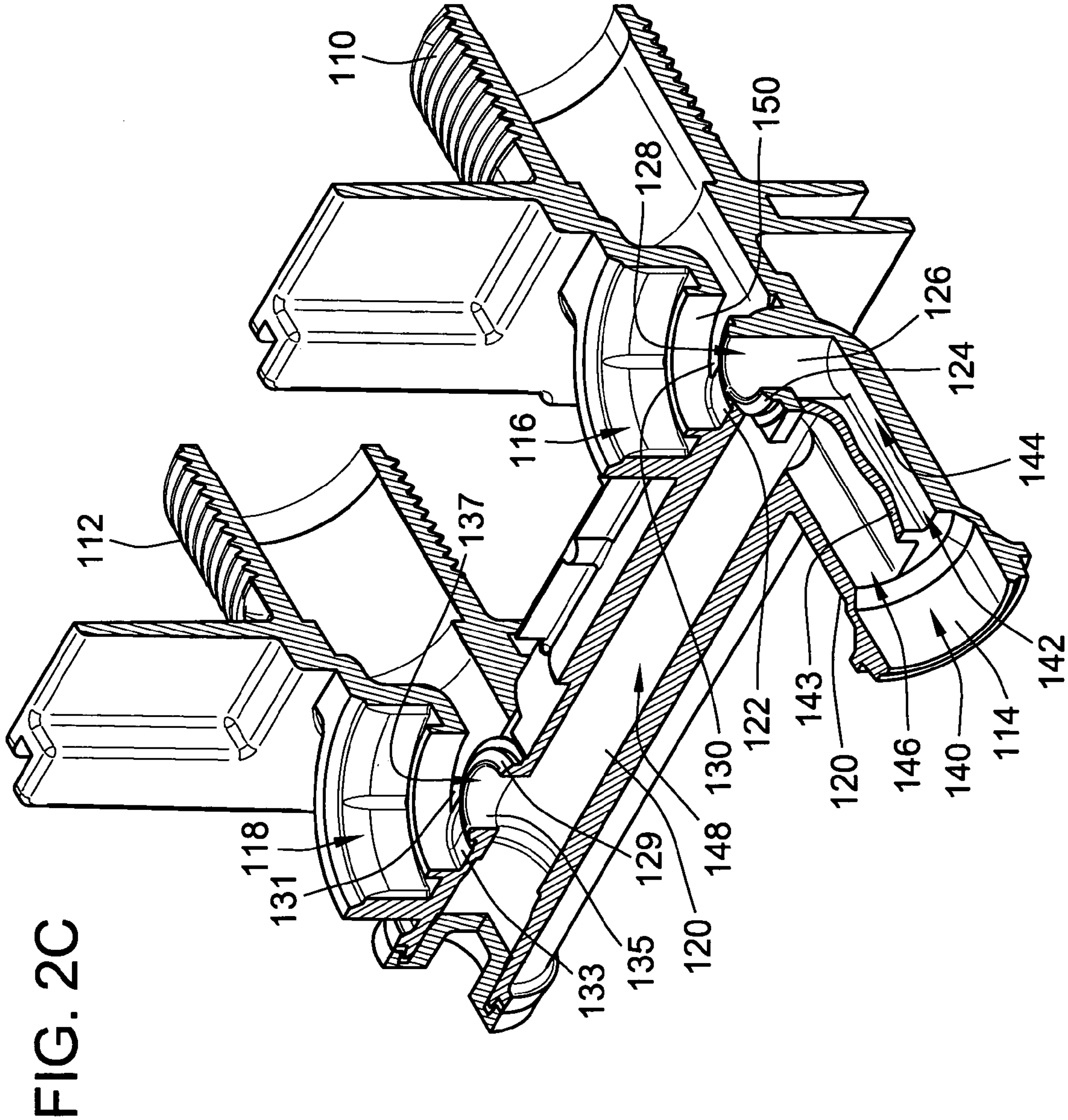
FIG. 2C is a perspective partial cross-section of the manifold of FIG. 2B, illustrating internal details including a septum wall of the manifold of FIG. 2B.

As shown in FIGS. 2B-2C, the first diaphragm chamber 116 of the manifold 106 includes a lower boundary wall 122, as depicted in the drawings, and a circular shaped valve seat 124 extending upward from the boundary wall 122. The valve seat 124 of the first diaphragm chamber 116, includes a wall 126 thereof defining an outlet 128 of the first diaphragm chamber 116, with the outlet 128 being disposed within the valve seat 124 of the first diaphragm chamber 116. The first diaphragm chamber 116 further defines an inlet 130 of the first diaphragm chamber 116, which is disposed outside of the valve seat 124, within the first diaphragm chamber 116, and passing through the boundary wall 122 of the first diaphragm chamber to provide fluid connection between the inlet side of the first diaphragm chamber 116 and the first fluid inlet 110, as shown in FIG. 2C.

As shown in FIGS. 2B-2C, the second diaphragm chamber 118 of the manifold 106 includes a lower boundary wall 133, as depicted in the drawings, and a circular shaped valve seat 129 extending upward from the boundary wall 133. The valve seat 129 of the second diaphragm chamber 118, includes a wall 135 thereof defining an outlet 137 of the second diaphragm chamber 118, with the outlet 137 being disposed within the valve seat 129 of the second diaphragm chamber 118. The second diaphragm chamber 118 further defines an inlet 131 of the second diaphragm chamber 118, which is disposed outside of the valve seat 129, within the second diaphragm chamber 118, and passing through the boundary wall 133 of the second diaphragm chamber 118 to provide fluid connection between the inlet side of the second diaphragm chamber 118 and the second fluid inlet 112, as shown in FIG. 2C.

As shown in FIG. 2C, and as illustrated schematically in FIGS. 2D-2E, the outlet conduit 120 of the manifold 106, of the exemplary embodiment, includes an outlet thereof connected to the fluid outlet 114 of the manifold 106. The outlet conduit 120 of the manifold 106 also includes a mixing chamber 140 adjacent the fluid outlet 114, and a divided intermediate segment 142 thereof, disposed between the mixing chamber 140 and the outlets 128, 137 of the first and second diaphragm chambers 116, 118.

The divided intermediate segment 142 of the outlet conduit 120 includes an imperforate septum wall 143 therein, dividing the intermediate segment 142 into a first and a second passage 144, 146. The first fluid passage 144 is connected in fluid communication between the mixing chamber 140 of the outlet conduit 120 and only the outlet 128 of the first diaphragm chamber 116. The second fluid passage 146 of the intermediate segment 142 is connected in fluid communication between the mixing chamber 140 of the outlet conduit 120 and only the outlet 137 of the second diaphragm chamber 118.

In the manifold 106 of the exemplary embodiment, the outlet conduit 120 also includes an undivided segment 148 disposed between the second fluid passage 146 of the divided intermediate 142 and the outlet 137 of the second diaphragm chamber 118.

As shown in FIGS. 2C and 2D, the first diaphragm chamber 116 defines an outer periphery 150 thereof, and the divided intermediate segment 142 of the outlet conduit 120 extends beyond the outer periphery 150 of the first diaphragm chamber 116, toward the mixing chamber 140 and outlet 114. In the exemplary embodiment of the manifold 106, the septum wall 143 merges with and forms a portion of the wall 126 extending from the valve seat 124 of the first diaphragm chamber 116.

Figure 1C:
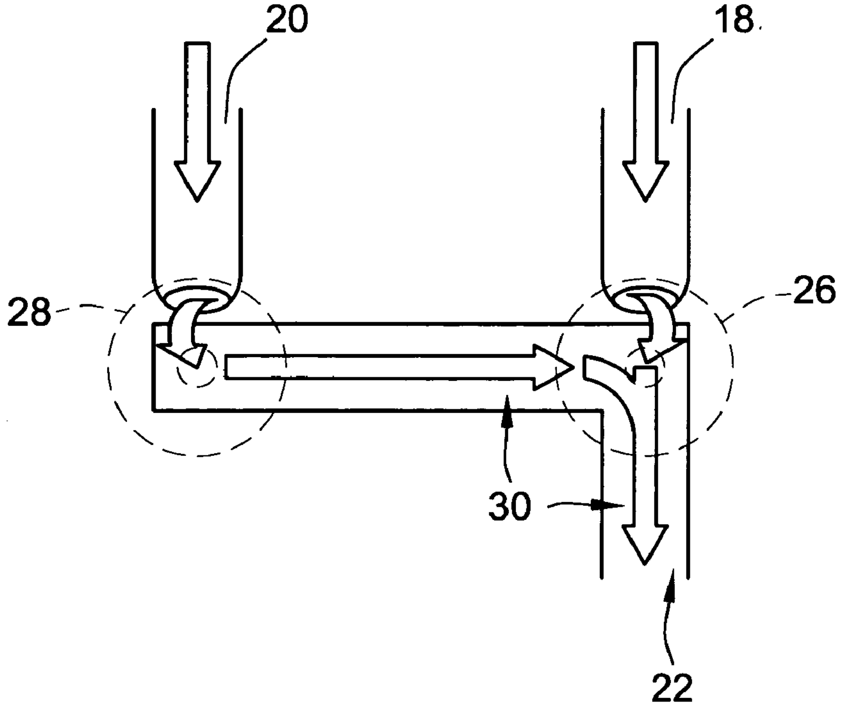
FIG. 1C (PRIOR ART)
FIG. 1C is a schematic illustration of the manner in which a first and second fluid flow through the manifold of FIG. 1B.
Figure 1D:
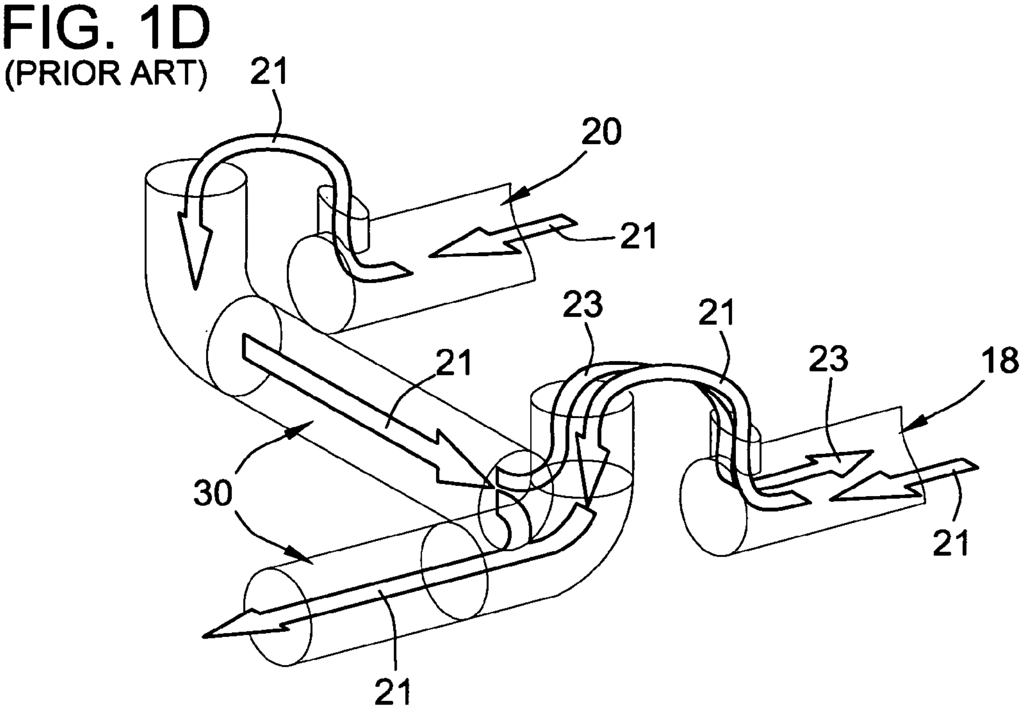
FIG. 1D (PRIOR ART)
FIG. 1D is a perspective view of the flow path of the manifold of FIG. 1B, showing the manner in which backflow can occur from a second inlet to a first inlet of the manifold in circumstances where the first inlet is connected to a source of fluid at a lower pressure than the source of fluid connected to the first inlet.

By virtue of the configuration of the exemplary embodiment of the manifold 106, according to the invention, it will be understood that fluid flowing from the outlets 128, 137 of both the first and second diaphragm chambers 116, 118 must flow entirely through the divided intermediate segment 142 and past the septum wall 143 a distance downstream from the outer periphery 150 of the first diaphragm chamber 116 before reaching the mixing chamber 140 of the outlet conduit 120. Those having skill in the art will readily recognize from the description above, and comparison of FIGS. 2D and 2E with FIGS. 1C and 1D illustrating the prior art, that the addition of the divided intermediate segment 142 of the invention makes it considerably more difficult for backflow to occur from the second inlet 112 to the first inlet 110 in a mixing valve having a manifold according to the invention.

As shown in FIG. 2F, in the exemplary embodiment of the manifold 106, the septum wall 143 divides the divided intermediate section of the outlet conduit 120 in such a manner that the first and second fluid passages of the divided segment 140 have substantially equal cross-sectional areas. In other embodiments of the invention, it may be desirable to form the divided intermediate segment 140 in such a way that the first and second fluid passages 142, 144 of the divided segment 140 of the outlet conduit 120 have unequal cross-sectional areas. The choice of having equal or unequal cross-sectional areas, is made, after taking into account the relative desired flow rates of fluid from the first and second inlet 110, 112. In general, performance of a manifold, according to the invention, may be enhanced by sizing the second flow passage 144 to provide a flow of fluid into the mixing chamber 140 having a velocity high enough to create a jetting effect that will help to entrain and induce a flow of fluid from the first passage 142 into the mixing chamber 140.

In practicing the invention, it will also generally be preferred to form the outlet conduit in such a manner that the cross-sectional area of the mixing chamber 140 is larger than the combined cross-sections of the first and second passages 144, 146 of the divided intermediate segment 142, in order to preclude having any back pressure generated by the entry of fluid into the mixing chamber 140. In some embodiments of the invention, it may also be desirable to attach an outlet fitting 152, as shown in FIG. 2A to the outlet 114 of the manifold 106. Where such an outlet fitting 152 is utilized, the mixing chamber 140 is typically effectively extended in length, and may result in further improving performance of a manifold 106 in accordance with the invention.

Those having skill in the art will recognize that, although the invention has been described herein in terms of an exemplary embodiment in the form of a water mixing valve, that the invention may be utilized in mixing valves handling other types of liquid or gaseous fluids. It is further noted, that although the exemplary embodiment of the invention illustrates a manifold for mixing only two fluids, that the invention can also be practiced with efficacy in embodiments requiring mixing more than two fluids.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A mixing valve, comprising:

a first and second diaphragm control valve, operatively attached to a manifold;

the manifold including a body defining a first fluid inlet, a second fluid inlet, a fluid outlet, a first diaphragm chamber for operative attachment thereto of the first control valve, a second diaphragm chamber for operative attachment thereto of the second control valve, and an outlet conduit;

the first diaphragm chamber of the manifold including an inlet and a valve seat thereof, with the valve seat defining the outlet of the first diaphragm chamber, the outlet of the first diaphragm chamber being disposed within the valve seat of the first diaphragm chamber, the inlet of the first diaphragm chamber being disposed outside of the valve seat, within the first diaphragm chamber, and connected in fluid communication with the first fluid inlet;

the second diaphragm chamber of the manifold including an inlet and a valve seat defining an outlet of the second diaphragm chamber, the outlet of the second diaphragm chamber being disposed within the valve seat of the second diaphragm chamber, the inlet of the second diaphragm chamber being disposed outside of the valve seat, within the second diaphragm chamber, and connected in fluid communication with the second fluid inlet;

the outlet conduit of the manifold having an outlet thereof connected to the fluid outlet, a mixing chamber adjacent the outlet and a divided intermediate second thereof disposed between the mixing chamber and the outlets of the first and second diaphragm chambers;

the divided intermediate segment of the outlet conduit having an imperforate septum wall therein, dividing the inlet section of the outlet conduit into a first and a second fluid passage, the first fluid passage being connected in fluid communication between the mixing chamber and only the outlet of the first diaphragm chamber, and the second fluid passage being connected in fluid communication between the mixing chamber and only the outlet of the second diaphragm chamber, the first fluid passage extending substantially parallel to a plane defined by the septum wall, the outlet conduit further including a lateral portion extending between and fluidly communicating the outlet of the second diaphragm chamber and the second fluid passage, wherein the lateral portion extends transverse to the septum wall; and wherein the first diaphragm chamber of the manifold includes a wall thereof separating the first diaphragm chamber from the second fluid passage of the divided intermediate segment of the outlet conduit.

2. The mixing valve of claim 1, wherein the first diaphragm chamber defines an outer periphery thereof, and the divided intermediate segment of the outlet conduit extends beyond the outer periphery of the first diaphragm chamber.

3. The mixing valve of claim 2, wherein the first and second fluid passages of the divided segment of the outlet conduit of the manifold have substantially equal cross sectional areas.

4. The mixing valve of claim 3, wherein the first and second fluid passages of the divided segment of the outlet conduit of the manifold have unequal cross sectional areas.

5. A manifold for a mixing valve, the manifold comprising:

a body defining a first fluid inlet, a second fluid inlet, a fluid outlet, a first diaphragm chamber for a first control valve, a second diaphragm chamber for a second control valve, and an outlet conduit;

the first diaphragm chamber including a valve seat defining an inlet and an outlet of the first diaphragm chamber, the outlet of the first diaphragm chamber being disposed within the valve seat of the first diaphragm chambers the inlet of the first diaphragm chamber being disposed outside of the valve seat, within the first diaphragm chamber, and connected in fluid communication with the first fluid inlet;

the second diaphragm chamber including a valve seat defining an inlet and an outlet of the diaphragm chamber, the outlet of second diaphragm chamber being disposed within the valve seat of the second diaphragm chamber, the inlet of the second diaphragm chamber being disposed outside of the valve seat, within the second diaphragm chambers, and connected in fluid communication with the second fluid inlet;

the outlet conduit having an outlet hereof connected to the fluid outlet, a mixing chamber adjacent the outlet, and a divided intermediate segment thereof disposed between the mixing chamber and the outlets of the first and second diaphragm chambers;

the divided intermediate segment of the outlet conduit having an imperforate septum wall therein, dividing the inlet section of the outlet conduit into a first and a second fluid passage, the first fluid passage being connected in fluid communication between the mixing chamber of the outlet conduit and only the outlet of the first diaphragm chamber, and the second fluid passage being connected in fluid communication between the mixing chamber and only the outlet of the second diaphragm chamber, the divided intermediate segment and septum wall of the outlet conduit being positioned adjacent the first diaphragm chamber and closer to the first diaphragm chamber than the second diaphragm chamber and the mixing chamber being positioned closer to the first diaphragm chamber than the second diaphragm chamber; and wherein the outlet conduit is L-shaped and defined by a lateral portion and the divided intermediate segment, the lateral portion extending, at least in part, between the first and second diaphragm chambers at first and second ends of the lateral portion and intersecting the divided intermediate segment at the first end of the lateral portion to form the L-shape, and wherein the first diaphragm chamber is positioned at the intersection between the lateral portion and the divided intermediate segment.

6. The manifold of claim 5, wherein the outlet conduit further includes an undivided segment thereof disposed between the second fluid passage and the outlet of the second diaphragm chamber.

7. The manifold of claim 5, wherein the septum wall of the divided intermediate section of the outlet conduit forms a portion of a wall extending from the valve seat of the second diaphragm chamber.

8. The manifold of claim 5, wherein the first diaphragm chamber includes a wall thereof separating the first diaphragm chamber from the second fluid passage of the divided intermediate segment of the outlet conduit.

9. The manifold of claim 8, wherein the first diaphragm chamber defines an outer periphery thereof, and the divided intermediate segment of the outlet conduit extends beyond the outer periphery of the first diaphragm chamber.

10. The manifold of claim 9, wherein the first and second fluid passages of the divided intermediate segment of the outlet conduit have substantially equal cross sectional areas.

11. The manifold of claim 9, wherein the first and second fluid passages of the divided intermediate segment of the outlet conduit have unequal cross sectional areas.

12. The manifold of claim 5, wherein the mixing chamber has a cross sectional area that is larger than the combined cross sectional areas of the first and second flow passages of the divided intermediate segment of the outlet conduit.

13. The manifold of claim 5, wherein the first fluid passage extends from the outlet of the first diaphragm chamber to the mixing chamber and is substantially parallel to a plane defined by the septum wall.

14. The manifold of claim 13, wherein the septum wall includes a first face forming a portion of only the first fluid passage and a second face forming a portion of only the second fluid passage.

15. A mixing valve, comprising:

a first and second diaphragm control valve, operatively attached to a manifold;

the manifold including a body defining a first fluid inlet, a second fluid inlet, a fluid outlet, a first diaphragm chamber for operative attachment thereto of the first control valve, a second diaphragm chamber for operative attachment thereto of the second control valve, and an outlet conduit;

the first diaphragm chamber of the manifold including an inlet and a valve seat thereof, with the valve seat defining the outlet of the first diaphragm chamber, the outlet of the first diaphragm chamber being disposed within the valve seat of the first diaphragm chamber, the inlet of the first diaphragm chamber being disposed outside of the valve seat, within the first diaphragm chamber, and connected in fluid communication with the first fluid inlet;

the second diaphragm chamber of the manifold including an inlet and a valve seat defining an outlet of the second diaphragm chamber, the outlet of the second diaphragm chamber being disposed within the valve seat of the second diaphragm chamber, the inlet of the second diaphragm chamber being disposed outside of the valve seat, within the second diaphragm chamber, and connected in fluid communication with the second fluid inlet;

the outlet conduit of the manifold having an outlet thereof connected to the fluid outlet, a mixing chamber adjacent the outlet, and a divided intermediate segment thereof disposed between the mixing chamber and the outlets of the first and second diaphragm chamber;

the divided intermediate segment of the outlet conduit having an imperforate septum wall therein, dividing the inlet section of the outlet conduit into a first and a second fluid passage, the first fluid passage being connected in fluid communication between the mixing chamber and only the outlet of the first diaphragm chamber, and the second fluid passage being connected in fluid communication between the mixing chamber and only the outlet of the second diaphragm chamber, the first fluid passage extending substantially parallel to a plane defined by the septum wall, the outlet conduit further including a lateral portion extending between and fluidly communicating the outlet of the second diaphragm chamber and the second fluid passage, wherein the lateral portion extends transverse to the septum wall; and wherein the outlet conduit is L-shaped and defined by the lateral portion and the divided intermediate segment, the lateral portion extending, at least in part, between the first and second diaphragm chambers at first and second ends of the lateral portion and intersecting the divided intermediate segment at the first end of the lateral portion to form the L-shape, and wherein the first diaphragm chamber is positioned at the intersection between the lateral portion and the divided intermediate segment.

16. The mixing valve of claim 15, wherein the outlet conduit of the manifold further includes an undivided segment thereof disposed between the second fluid passage and the outlet of the second diaphragm chamber.

17. The mixing valve of claim 15, wherein the septum wall of the manifold of the divided intermediate section of the outlet conduit forms a portion of a wall extending from the valve seat of the first diaphragm chamber.

* * * * *